United States Patent
Kuo et al.

(10) Patent No.: US 8,355,546 B2
(45) Date of Patent: Jan. 15, 2013

(54) METHOD FOR IDENTIFYING FINGERPRINT IMAGE

(75) Inventors: Cheng-Hsing Kuo, Taipei Hsien (TW); Yen-Hui Wang, Taipei Hsien (TW); Tung-Jung Wu, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 450 days.

(21) Appl. No.: 12/696,017

(22) Filed: Jan. 28, 2010

(65) Prior Publication Data

US 2011/0096962 A1 Apr. 28, 2011

(30) Foreign Application Priority Data

Oct. 26, 2009 (TW) ................................ 98136126 A

(51) Int. Cl.
*G06K 9/00* (2006.01)
(52) U.S. Cl. ..................................................... 382/124
(58) Field of Classification Search .................... 382/124
See application file for complete search history.

(56) References Cited

U.S. PATENT DOCUMENTS

| | | | | |
|---|---|---|---|---|
| 5,610,993 | A | * | 3/1997 | Yamamoto ..................... 382/124 |
| 2005/0175225 | A1 | * | 8/2005 | Shinzaki ........................ 382/124 |
| 2007/0047777 | A1 | * | 3/2007 | Adachi et al. ................. 382/124 |

OTHER PUBLICATIONS

Yun et al., "Adaptive fingerprint image enhancement with fingerprint image quality analysis," Jan. 2006, Journal Image and Vision Computing, vol. 24, pp. 101-110.*

* cited by examiner

*Primary Examiner* — John Strege
(74) *Attorney, Agent, or Firm* — Winston Hsu; Scott Margo

(57) ABSTRACT

A method for identifying a fingerprint image includes inputting a fingerprint image captured by an electronic device, calculating an amount of valid ridge pixels in an amount of total ridge pixels of the fingerprint image to generate a first ratio, calculating an amount of successive ridge pixels in an amount of total ridge pixels of the fingerprint image to generate a second ration when the first ratio is identified within a first predetermined range, and determining the fingerprint image as a valid fingerprint image when the second ratio is identified within a second predetermined range.

19 Claims, 4 Drawing Sheets

METHOD FOR IDENTIFYING FINGERPRINT IMAGE

BACKGROUND OF THE INVENTION

1. Field of the Invention

The present invention relates to a method for identifying a fingerprint image, and more particularly, to a method for identifying a fingerprint image captured by an electronic device correctly and rapidly.

2. Description of the Prior Art

Because a fingerprint of a person is unique and invariable, the fingerprint identification technology has been widely used for personal identity verification. For example, the fingerprint identification technology can be used in many portable electronic products for security control. In general, for ensuring the quality of electronic products with a fingerprint identification function, product manufacturers usually perform many normal function inspections for the electronic product during the manufacturing process or after manufacturing in order to verify whether the electronic product works well and conforms to quality management requirements.

For example, an electronic device having a fingerprint identification function should be able to capture a clear fingerprint image and perform a fingerprint identification process on the captured fingerprint image. However, if quality of the captured fingerprint image is not well suited for the following identification process, this may result in inaccurate fingerprint identification. Therefore, for ensuring the electronic device having fingerprint identification function can accurately scan and capture the fingerprint image of a user, a scan function test is a common test item for such kind of electronic device. The conventional scan function inspection method is first to establish a fingerprint database of a tester or a specific fingerprint, and the electronic device (device under test) captures the fingerprint image after a tester, or a finger glove, a finger mold, or a fake finger, which having a specific fingerprint, sweeps on the electronic device. After that, the electronic device subsequently implements several identification processes, such as image pre-process, feature extraction, and fingerprint matching on the captured fingerprint image in order to examine if the captured fingerprint image is identical to the fingerprint image stored in the fingerprint database for realizing the inspection purpose. Thus, as the captured fingerprint image is identical to the fingerprint image stored in the fingerprint data base, this means the electronic device has a suitable scan function.

However, for an electronic device (device under test), the above-mentioned inextricable identification processes (feature extraction, image matching process) are too complicated and require large consumption of operation resources and operation time. In practice, the above-mentioned method can not provide efficient testing for mass production. Therefore, designing a proper test method with a simple operation and low cost for providing correctly testing procedures should be a concern in progressive system design.

SUMMARY OF THE INVENTION

It is therefore an objective of the present invention to provide a method for identifying a fingerprint image.

The present invention discloses a method for identifying a fingerprint image, comprising inputting a fingerprint image captured by an electronic device; calculating an amount of valid pixels in an amount of total ridge pixels of the fingerprint image to generate a first ratio; calculating an amount of successive ridge pixels in an mount of total ridge pixels of the fingerprint image to generate a second ratio when the first ratio is identified within a first predetermined range; and determining the fingerprint image as an valid fingerprint image when the second ratio is identified within a second predetermined range.

The present invention further discloses a method for identifying a fingerprint image, comprising inputting a fingerprint image captured by an electronic device; cropping a surrounding portion of the fingerprint image; calculating an amount of valid ridge pixels in the amount of total ridge pixels of the cropped fingerprint image to generate a first ratio; calculating an amount of successive ridge pixels in the amount of total ridge pixels of the cropped fingerprint image when the first ratio is identified within a first predetermined range to generate a second ratio; and determining the fingerprint image as an valid fingerprint image when the second ratio is identified within a second predetermined range.

These and other objectives of the present invention will no doubt become obvious to those of ordinary skill in the art after reading the following detailed description of the preferred embodiment that is illustrated in the various figures and drawings.

DETAILED DESCRIPTION

Traditionally, during manufacture of an electronic device having a fingerprint identification function, the manufacturer needs to perform various complicated processes, such as image pre-process, feature extraction, fingerprint matching, etc., to examine the scan function of the electronic device. However, the said complicated processes are just software execution processes and irrelevant to the scan function of the electronic device. In contrast, the present invention can offer a simple and rapid method without performing the said complicated processes for real-time inspecting the scan function of electronic device correctly.

Figure 1:
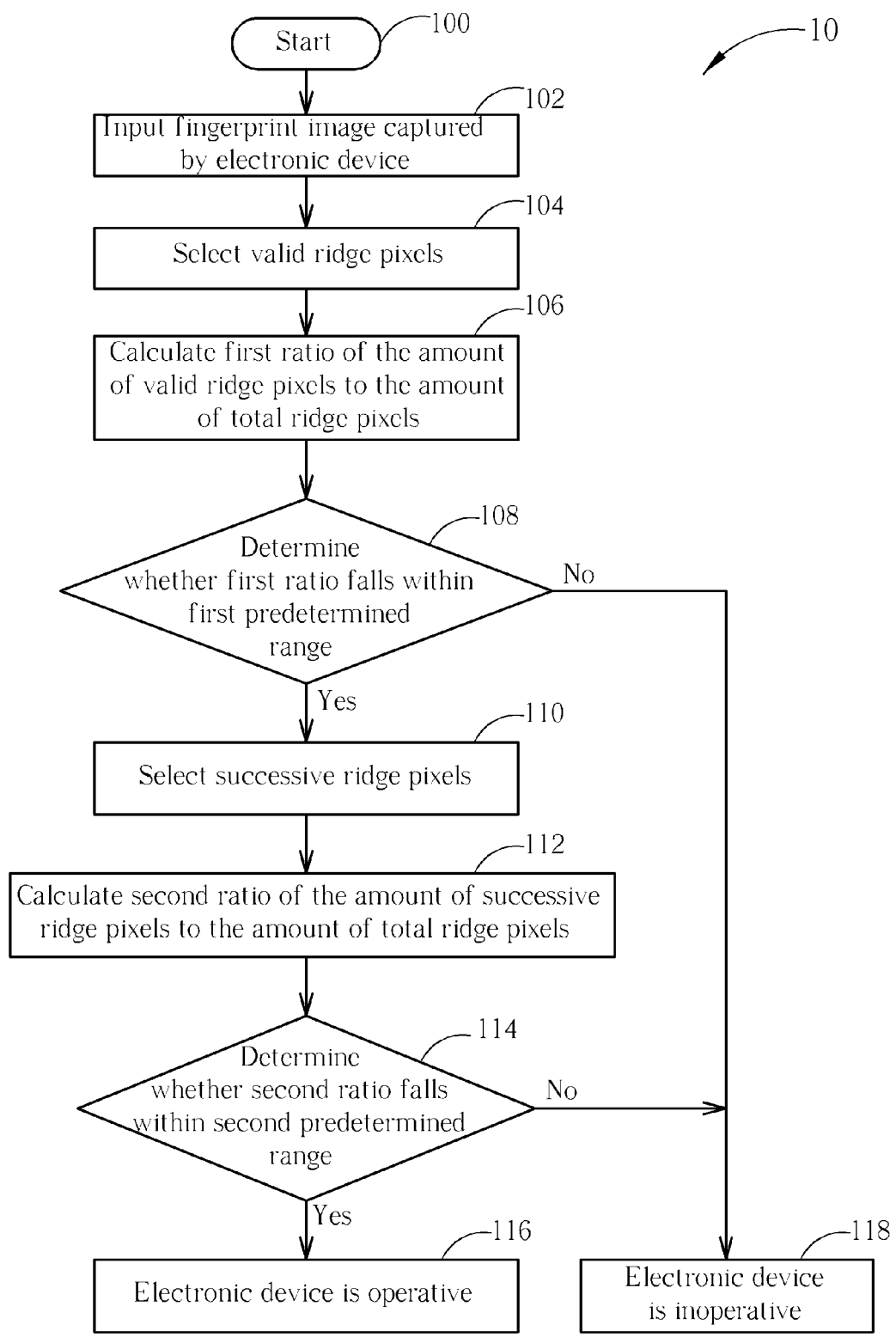
FIG. 1 is a procedure according to a first embodiment of the invention.

Please refer to FIG. 1, which is a procedure 10 according to a first embodiment of the invention. The procedure 10 is utilized for inspecting an image scan function of an electronic device. The electronic device is capable of scanning and capturing a fingerprint image, and performing a fingerprint identification process on the fingerprint image. The procedure 10 includes the following steps:

Step 100: Start.

Step 102: Input a fingerprint image captured by electronic device.

Step 104: Select valid ridge pixels of the fingerprint image.

Step 106: Calculate a first ratio of the amount of valid ridge pixels to the amount of total ridge pixels.

Step 108: Determine whether the first ratio falls within first predetermined range. If yes, go to Step 110; otherwise, go to Step 118.

Step 110: Select successive ridge pixels of a fingerprint image.

Step 112: Calculate a second ratio of the amount of successive ridge pixels to the amount of total ridge pixels.

Step 114: Determine whether the second ratio falls within second predetermined range. If yes, go to Step 116; otherwise, go to Step 118.

Step 116: Determine the fingerprint image as a valid fingerprint image and determine the electronic device is operative. End.

Step 118: Determine the fingerprint image as an invalid fingerprint image and determine the electronic device is inoperative. End.

According to the procedure 10, for the fingerprint image captured by the electronic device, the present invention can estimate whether the proportion of the amount of all the valid ridge pixels to the amount of total ridge pixels of the fingerprint image is in the first predetermined range. After that, the present invention can estimate whether the proportion of the amount of all the successive ridge pixels to the amount of total ridge pixels of the fingerprint image is in the second predetermined range, and determine whether the electronic device is capable of capturing a normal image accordingly. Therefore, through the procedure 10, the present invention can provide a simple and rapid solution to distinguish whether the fingerprint image is clear enough and usable, and further verify fingerprint image scan function of the electronic device effectively.

As stated in the prior art, when the manufacturer wants to examine whether the scan function of the electronic device works well, the manufacturer needs to perform several inextricable identification processes, such as feature extraction and fingerprint image matching, on the fingerprint image captured by the electronic device inspection. However, massive complicated algorithms are required for realizing the above-mentioned identification process, and this consumes lots of operation resources and operation time. Comparatively, the present invention can correctly inspect the scan function of the electronic device by just using simple pixel calculation so as to realize the function inspect purpose rapidly and efficiently.

Furthermore, for inspecting the image scan function of the electronic device, the present invention first utilizes the electronic device to capture a fingerprint image, and examine if the captured fingerprint image is a normal fingerprint image in order to determine whether the image scan function of the electronic device works well. In other words, the present invention can utilize the fingerprint image captured by the electronic device (device under test) for inspection. In Step 102, the fingerprint image can be captured by the electronic device (device under test) after any person, finger glove, finger mold, or fake finger, which having specific fingerprint sweeps on the electronic device.

The electronic device preferably includes a capturing unit for scanning and capturing the fingerprint image. For example, the capturing unit can be an optical sensing device, a capacitive sensing device, or an ultrasonic sensing device, and this should not be a limitation of the present invention, any apparatus or method which can scan and capture the fingerprint image is available. Moreover, the electronic device further includes an identification unit for performing a fingerprint identification process on the fingerprint image, and the identification unit can be implemented by hardware, firmware, software or combination thereof, which can perform the fingerprint identification process.

A fingerprint is made of a series of ridges and furrows. The raised parts of the fingerprint are ridges, and the valley parts are furrows. In general, the ridge and the furrow are presented with different pixel-levels respectively for distinction. Of course, in various fingerprint images, the color or color level range for displaying the said ridge and furrow may be different in accordance with various image capturing methods and characteristics. Regarding the pixel classification of the fingerprint image, the pixels on the ridges are considered as valid ridge pixels, the other pixels are considered as background pixels. Therefore, for brevity of description, the fingerprint indicates the ridge part of the fingerprint image in the following description.

In fact, the captured fingerprint image is built by various pixels. The present invention can examine the captured fingerprint image by taking a pixel as the unit correspondingly. In other words, the present invention is able to perform the function inspection process through checking the information on each pixel of the captured fingerprint image. In Step 104, all valid ridge pixels of fingerprint image the procedure 10 are selected from the total ridge pixels of the captured fingerprint image after the captured fingerprint image is obtained. The said valid ridge pixels mean the pixels with ridge information in the captured fingerprint image, i.e. the pixels being passed through by the ridges. Thus, in step 104, the sum of all the valid ridge pixels of the captured fingerprint image is calculated. Preferably, the sum of total pixels of the captured fingerprint image is calculated. After that, in Step 106, a first ratio of the amount of valid ridge pixels to the amount of total ridge pixels of the captured fingerprint image can be calculated according to the calculation result of Step 104.

For a normal fingerprint image, the valid ridge pixels must hold a certain rational image area in the normal fingerprint image when considering the overall situation. In general, the percentage of the valid ridge pixels is about 70% to 80% in the normal fingerprint image. In such a condition, if the amount of the valid ridge pixels is too many or too few, the corresponding fingerprint image should not be a valid fingerprint image. This means the scan function of the electronic device (device under test) capturing the corresponding fingerprint image is abnormal. In Step 108, the procedure 10 determines whether the first ratio (the amount of valid ridge pixels to the amount of total ridge pixels) falls within the first predetermined range, such as between 70% and 80%. For example, if the first ratio falls within the range (75%~80%), go to Step 110; Otherwise go to Step 118. Thus, if the proportion of the amount of valid ridge pixels to the amount of total ridge pixels does not fall within the first predetermined range, the corresponding fingerprint image is regarded as an invalid fingerprint image, that is, the electronic device cannot correctly scan and capture the fingerprint swept by a tester. In such a condition, the electronic device is inoperative and the inspection result is fail.

Figure 2:
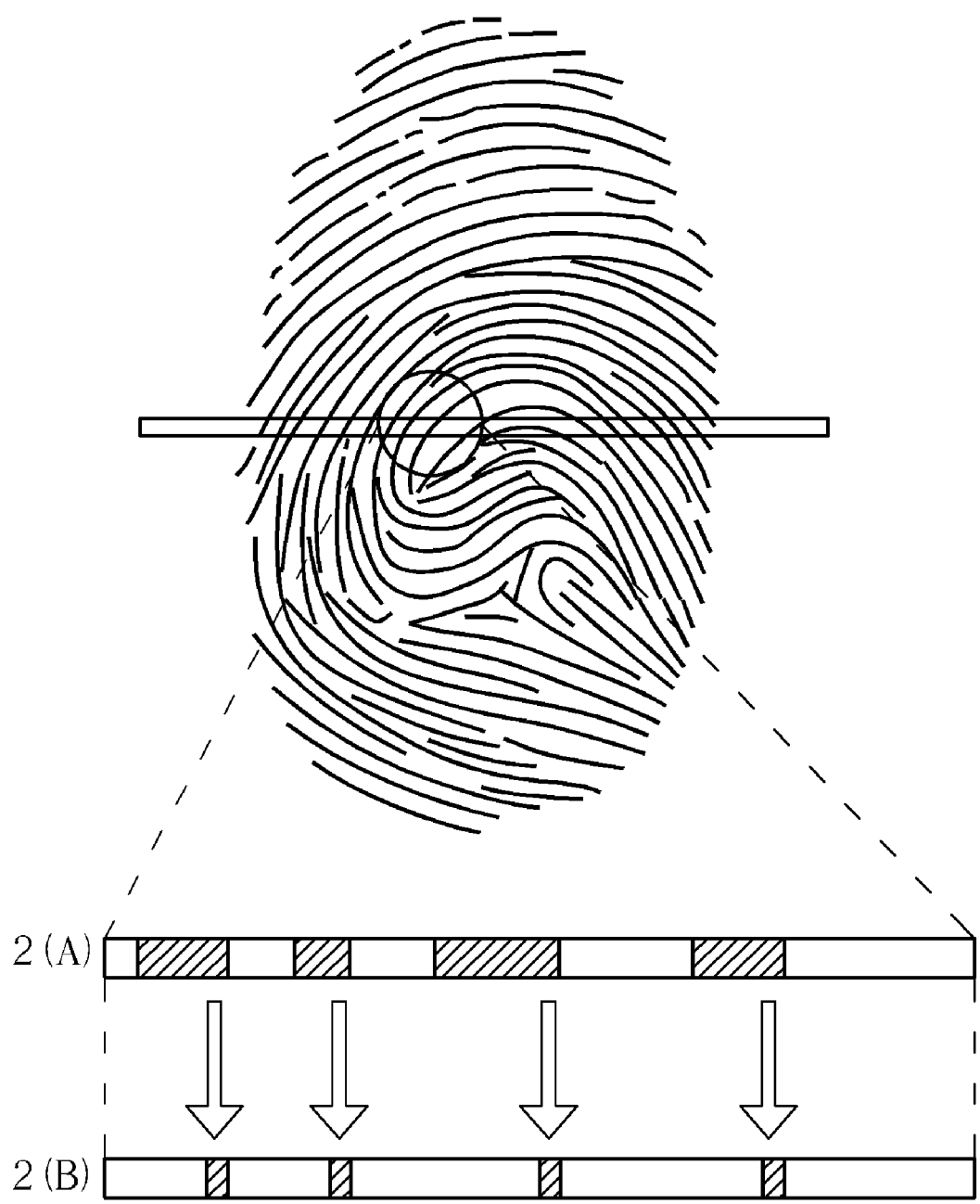
FIG. 2 is schematic diagram of successive ridge pixels according to the first embodiment of the present invention.

In Step 110, all successive ridge pixels in a fingerprint image the procedure 10 are selected and the amount of all successive ridge pixels is calculated. The successive ridge pixel indicate the single valid ridge pixel which both sides are invalid ridge pixels or consecutive valid ridge pixel group for each row (one pixel wide) of the fingerprint image. The amount of all successive ridge pixels equals the sum of single valid ridge pixel or consecutive valid ridge pixels in the fingerprint image. Also, the amount of total valid ridge pixel groups can be calculated row-by-row successively. Please refer to FIG. 2, taking a section of pixels of one of the pixel row for example, the part (A) shown in FIG. 2 represents an original fingerprint image, suppose whether the single valid ridge pixel single or the consecutive valid ridge pixel group are represented by single pixels so that the original fingerprint image can be simplified into a kind of line diagram shown in the part (B) of FIG. 2. Therefore, in Step 110, the calculated amount of all successive ridge pixels is the sum of all the simplified single pixels shown in the part (B) of FIG. 2. For a normal fingerprint image, the original fingerprint image can approximately keep a fingerprint pattern as well after the simplifying operation shown in FIG. 2. In other words, after simplifying operations, the distribution of valid ridge pixels should keep within a certain proportion range. In addition, in Step 112, the second ratio of the amount of successive ridge pixels to the amount of total ridge pixels can be calculated according to the calculation result of Step 110, and the second ratio can be offered to Step 114.

When a failure situation occurs in the electronic device or the scan speed of the electronic device is slower than the sweeping speed of the tester, a massive black space or a massive blank space may occur in the fingerprint image. However, such a fingerprint image occurring mass black (blank) space problem may also pass the determination of Step 108, and be determined as a normal fingerprint image. In Step 114, to prevent an error determination situation, the present invention can further determine if the second ratio (the amount of successive ridge pixels to the amount of total ridge pixels) falls within the second predetermined range, such as between 10% and 15%. For example, if the second ratio falls within the range (10%~15%), go to Step 116; Otherwise go to Step 118. Thus, as soon as the massive black (blank) space occurs in the fingerprint image, the second ratio may be too high or too low so that the error situation will be detected accordingly. In other words, through Step 114, the distribution situation of the valid ridge pixels of the fingerprint image can be checked again.

After passing through the determination process of Step 108 and step 114 successfully, the fingerprint image is able to be certainly considered as a normal and clear fingerprint image. Again, in Step 116, the corresponding fingerprint image is determined as a valid fingerprint image, this means the electronic device is capable of correctly scanning and capturing the fingerprint swept by the tester so that the inspection result is determined as pass. In short, through Step 108, the procedure 10 can check whether the captured fingerprint image conforms to a normal fingerprint image, and through Step 114, the procedure 10 can eliminate a bad fingerprint image having a massive black space or massive blank space that is not detected by Step 108. As a result, the present invention can confirm whether the captured fingerprint image fits in with the normal fingerprint image standard validly, and determine whether the function of the electronic device is regular or not accordingly.

Figure 3:
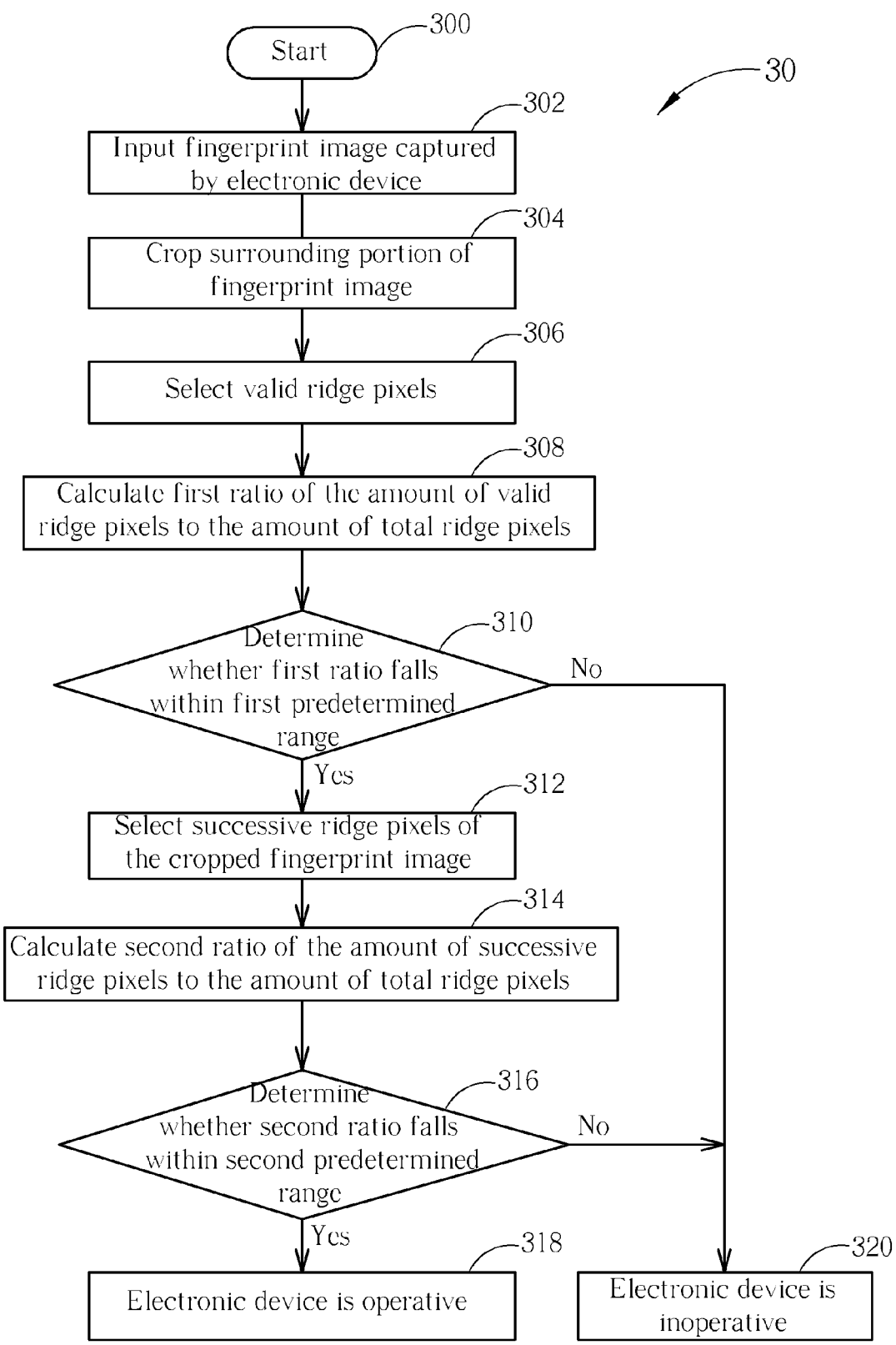
FIG. 3 is a procedure according to a second embodiment of the invention.

Furthermore, please refer to FIG. 3, which is a procedure 30 according to a second embodiment of the invention. The procedure 30 is utilized for inspecting an image scan function of an electronic device. The procedure 30 includes the following steps:

Step 300: Start.

Step 302: Input a fingerprint image captured by the electronic device.

Step 304: Crop the surrounding portion of the fingerprint image.

Step 306: Select valid ridge pixels of the cropped fingerprint image.

Step 308: Calculate a first ratio of the amount of valid ridge pixels to the amount of total ridge pixels.

Step 310: Determine whether the first ratio falls within a first predetermined range. If yes, go to Step 312; otherwise, go to Step 320.

Step 312: Select successive ridge pixels of the cropped fingerprint image.

Step 314: Calculate a second ratio of the amount of successive ridge pixels to the amount of total ridge pixels.

Step 316: Determine whether the second ratio falls within a second predetermined range. If yes, go to Step 318; otherwise, go to Step 320.

Step 318: Determine the fingerprint image as a valid fingerprint image and determine electronic device is operative. End.

Step 320: Determine fingerprint image as an invalid fingerprint image and determine electronic device is inoperative. End.

Figure 4:
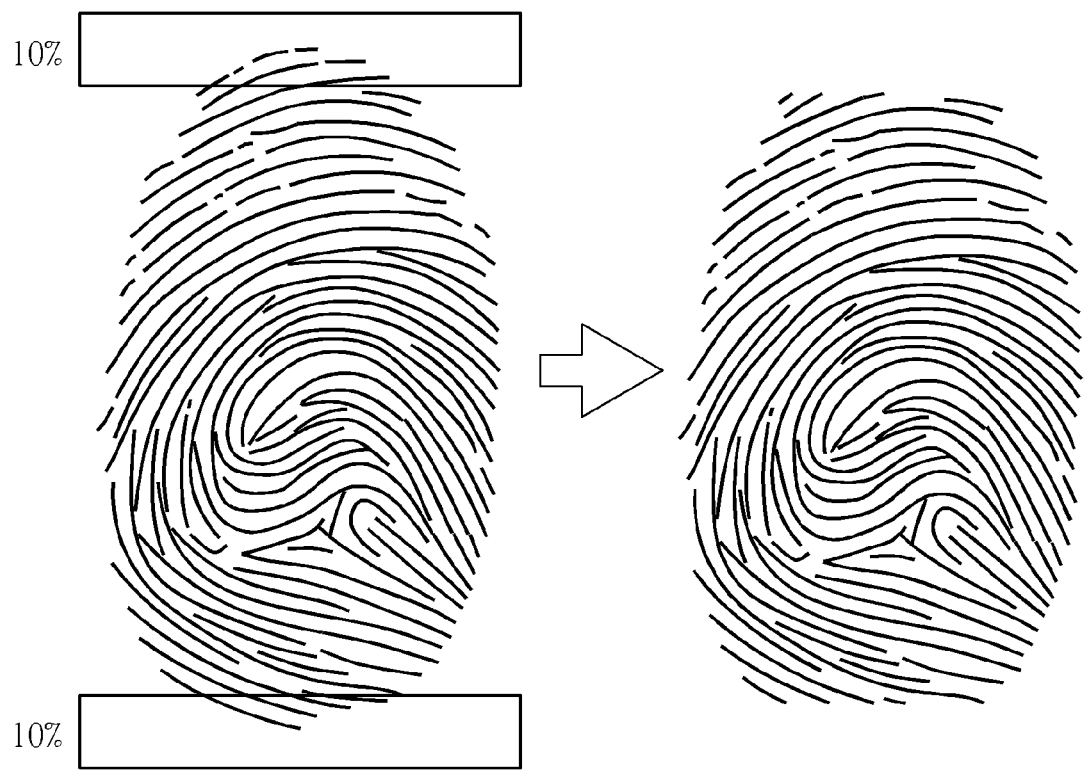
FIG. 4 is schematic diagram of cropping fingerprint image according to the second embodiment of the present invention.

The procedure 30 is utilized for illustrating the inspection implementation for image scan function of the electronic device. Related variations and the detailed description can be inferred from the foregoing description, so as not to be narrated herein. Different from the procedure 10 shown in FIG. 1, Step 304 is added into the procedure 30. In general, because the surrounding portion of the fingerprint image usually has much noise information, the outer part of the fingerprint image may comprise less ridge information or even no ridge information. In such a condition, the pixels of the outer part are easy to cause the error determination. Thus, in Step 304, some surrounding portion of a fingerprint image can be cropped to discard the useless pixels so as to enhance the accuracy of fingerprint image determination. Please note that the cropping area or size can be adjusted in accordance with requirements. For example, the uppermost and the lowermost of a fingerprint image are most susceptible to having incomplete ridge information due to sweep posture. As shown in FIG. 4, 10% of uppermost outer part and 10% of lowermost outer part are cropped, and the remained fingerprint image is provided to the following process for inspection. Therefore, compared with the procedure 10 shown in FIG. 1, the procedure 30 can achieve a more accurate inspection result.

Besides, the procedure 10 or 30 can be realized with any unit or apparatus. For example, the procedure 10 or 30 can be implemented by updating the firmware of the test machine. Please note that the procedure 10 or 30 is not limited to be performed according to the order shown in FIG. 1 or FIG. 3 if a roughly identical result can be obtained.

In summary, the present invention can provide a simple and rapid method without performing complicated fingerprint identification processes so as to inspect the scan function of electronic device correctly, and more particularly, any fingerprint can be provided for the inspection process without establishing a fingerprint database in advance so that the present invention is capable of providing a rapid and efficient scan function inspection process in the product line.

Those skilled in the art will readily observe that numerous modifications and alterations of the device and method may be made while retaining the teachings of the invention.

What is claimed is:

1. A method for identifying fingerprint image, comprising:
    inputting a fingerprint image captured by an electronic device;
    calculating an amount of valid ridge pixels in an amount of total ridge pixels of the fingerprint image to generate a first ratio;
    calculating an amount of successive ridge pixels in an amount of total ridge pixels of the fingerprint image to generate a second ratio when the first ratio is identified within a first predetermined range; and
    determining the fingerprint image as a valid fingerprint image when the second ratio is identified within a second predetermined range.

2. The method of claim 1, wherein the amount of the successive ridge pixels is an amount of single valid ridge pixels or consecutive valid ridge pixels in the fingerprint image.

3. The method of claim 1, wherein the step of calculating the amount of valid ridge pixels in the amount of total ridge pixels of the fingerprint image further comprises:
- calculating the amount of total ridge pixels of the fingerprint image.

4. The method of claim 1, wherein the step of calculating the amount of valid ridge pixels in the amount of total ridge pixels of the fingerprint image comprises:
- selecting valid ridge pixels with ridge information from the total ridge pixels of the fingerprint image; and
- calculating the amount of the selected valid ridge pixels.

5. The method of claim 1, wherein the step of calculating the amount of successive ridge pixels in the amount of total ridge pixels of the fingerprint image to generate the second ration when the first ratio is identified within the first predetermined range comprises:
- selecting successive ridge pixels from each pixel row of the fingerprint image when the first ratio is identified within the first predetermined range; and
- calculating the amount of the selected successive ridge pixels to generate the second ratio in the amount of total ridge pixels of the fingerprint image.

6. The method of claim 1, wherein the electronic device comprises a capturing unit for scanning and capturing the fingerprint image.

7. The method of claim 1, wherein the electronic device comprises an identification unit for performing a fingerprint identification process on the fingerprint image.

8. A method for identifying fingerprint image, comprising:
- inputting a fingerprint image captured by an electronic device;
- cropping a surrounding portion of the fingerprint image;
- calculating an amount of valid ridge pixels in the amount of total ridge pixels of the cropped fingerprint image to generate a first ratio;
- calculating an amount of successive ridge pixels in the amount of total ridge pixels of the cropped fingerprint image to generate a second ratio when the first ratio is identified within a first predetermined range; and
- determining the fingerprint image as a valid fingerprint image when the second ratio is identified within a second predetermined range.

9. The method of claim 8, wherein the amount of the successive ridge pixels is an amount of single valid ridge pixels or consecutive valid ridge pixels in the cropped fingerprint image.

10. The method of claim 8, wherein the step of calculating the amount of valid ridge pixels in the cropped fingerprint image further comprises:
- calculating the amount of total ridge pixels of the cropped fingerprint image.

11. The method of claim 8, wherein the step of calculating the amount of valid ridge pixels in the amount of total ridge pixels of the cropped fingerprint image comprises:
- calculating an amount of pixels with ridge information from the total ridge pixels of the cropped fingerprint image.

12. The method of claim 8, wherein the step of calculating the amount of successive ridge pixels in the amount of total ridge pixels of the cropped fingerprint image to generate a second ratio when the first ratio is identified within the first predetermined range comprises:
- calculating the amount of the successive ridge pixels of each pixel row of the fingerprint image when the first ratio is identified within the first predetermined range.

13. The method of claim 8, wherein the electronic device comprises a capturing unit for scanning and capturing the fingerprint image.

14. The method of claim 8, wherein the electronic device comprises an identification unit for performing a fingerprint identification process on the fingerprint image.

15. The method of claim 1, further comprising:
- cropping a surrounding portion of the fingerprint image;
- calculating an amount of valid ridge pixels in the amount of total ridge pixels of the cropped fingerprint image to generate a third ratio;
- calculating an amount of successive ridge pixels in the amount of total ridge pixels of the cropped fingerprint image to generate a fourth ratio when the third ratio is identified within a third predetermined range; and
- determining the fingerprint image as a valid fingerprint image when the fourth ratio is identified within a fourth predetermined range.

16. The method of claim 15, wherein the amount of the successive ridge pixels is an amount of single valid ridge pixels or consecutive valid ridge pixels in the cropped fingerprint image.

17. The method of claim 15, wherein the step of calculating the amount of valid ridge pixels in the cropped fingerprint image further comprises:
- calculating the amount of total ridge pixels of the cropped fingerprint image.

18. The method of claim 15, wherein the step of calculating the amount of valid ridge pixels in the amount of total ridge pixels of the cropped fingerprint image comprises:
- calculating an amount of pixels with ridge information from the total ridge pixels of the cropped fingerprint image.

19. The method of claim 15, wherein the step of calculating the amount of successive ridge pixels in the amount of total ridge pixels of the cropped fingerprint image to generate the fourth ratio when the third ratio is identified within the third predetermined range comprises:
- calculating the amount of the successive ridge pixels of each pixel row of the fingerprint image when the third ratio is identified within the third predetermined range.

* * * * *